March 24, 1970  E. VERSCHUUR  3,502,103
INLET DEVICE FOR INTRODUCING WATER AND OIL IN A PIPELINE
Filed Feb. 23, 1968

INVENTOR:
EKE VERSCHUUR
BY: J. H. McCarthy
HIS AGENT

United States Patent Office 3,502,103
Patented Mar. 24, 1970

3,502,103
INLET DEVICE FOR INTRODUCING WATER AND OIL IN A PIPELINE
Eke Verschuur, Amsterdam, Netherlands, assignor to Shell Oil Company, New York, N.Y., a corporation of Delaware
Filed Feb. 23, 1968, Ser. No. 707,817
Claims priority, application Netherlands, May 10, 1967, 6706568
Int. Cl. F17d 1/16; F15d 1/06, 1/04
U.S. Cl. 137—567     6 Claims

ABSTRACT OF THE DISCLOSURE

An inlet device for introducing water and oil in a pipeline in which an enlarged cylindrical housing is connected in axial alignment with a pipeline preferably by means of a conical shaped connector and housing an open-ended tubular section having a cross sectional area at least 50% greater than the cross sectional area of the pipeline. The annular chamber between the tubular section and the cylindrical housing serves to admit the water into the pipeline and the interior of the tubular section serves to admit a more viscous fluid, for example, oil.

BACKGROUND OF THE INVENTION

The invention relates to an inlet piece for a pipeline for transport of a viscous liquid surrounded by an annular layer of liquid with a low viscosity, which liquids are entirely or substantially insoluble with respect to each other, and to a process for the transport of those liquids through a pipeline.

The term viscous liquid is here understood also to cover liquids possessing non-Newtonian properties. Hereinafter a viscous liquid will be denoted by the term oil and a liquid with a low viscosity by the term water.

A known procedure is the addition of water in order to reduce the friction losses in pumping mineral oil through a pipeline. The oil moves in the form of a long plug through the center of the line, the water forming a layer between the oil and the wall of the pipeline. The water then serves as lubricant. This procedure makes it possible for very stiff oils to be transported through a pipeline. In this connection it is of great importance that no oil drops are present besides the oil plug because these oil drops have to be dispersed in the water, as a result of which a thicker layer of water is required and, consequently, a smaller part of the volume transported consists of oil.

It has been found that the formation of oil drops occurs exclusively where the water is introduced. Drop formation occurs more readily when the viscosity of the oil is lower.

The invention provides the means by which these difficulties can be overcome.

SUMMARY OF THE INVENTION

The invention therefore relates to an inlet piece for a pipeline for transport of a viscous liquid surrounded by an annular layer of liquid with a low viscosity, which liquids are entirely or substantially insoluble with respect to each other, which inlet piece consists of a space surrounded by a rotation-symmetrical wall provided with a central supply pipe for the viscous liquid and with an annular supply channel for the liquid with a low viscosity, which channel is located around and in a coaxial position relative to the supply pipe and which terminates approximately at the extreme end of the central supply pipe, the cross-sectional area of the central supply pipe being at least 50% larger than the cross-sectional area of the pipeline, and which inlet piece is further provided with means for the connection to the pipeline and to the pumps for the liquids.

Immediately upon the introduction of the oil, an annular layer of water forms around the oil owing to the presence of the annular channel terminating approximately at the extreme end of the central supply pipe. In this connection it is of essential importance that the cross-sectional area of the central supply pipe is larger than the cross-sectional area of the pipeline. In this way it is ensured that the average rate of outflow of the oil is lower than the average rate of flow of that oil in the pipeline. In the pipeline for transport of oil as referred to in this specification, a specific minimum value of the average rate of flow of the oil with water must be maintained, because otherwise the oil will penetrate the annular layer of water and will touch the wall of the pipeline. This is undesirable. The minimum flow rate referred to generally lies in the neighborhood of 0.5 meter per second for pipelines as used in practice. As rate of outflow of the oil from the central supply pipe this flow rate is too high. Drops will then be formed when the oil meets the water. Edge effects in the velocity profile of the outflowing oil play a role here. These effects decrease rapidly with decreasing rate of outflow of the oil.

The cross-sectional area of the central supply pipe is preferably at least twice and at most ten times as large as the cross-sectional area of the pipeline. In most cases, within these limits a situation where the oil is surrounded by water is obtained without drop formation. The width of the annular supply channel is preferably taken to be such that the difference between the average rates of outflow of the two liquids is less than 0.5 meter per second. The ratio between the quantities of water and oil to be used in pumping oil through a pipeline may vary between wide limits. Therefore there is little sense in relating the dimensions of the annular supply channel to the dimensions of the central supply pipe. However, when starting from the desideratum formulated hereinbefore, concerning the difference between the average rates of outflow, someone skilled in the art will be perfectly able to determine the appropriate dimensions of the annular supply channel.

DESCRIPTION OF THE PREFERRED EMBODIMENTS

Figure 1:
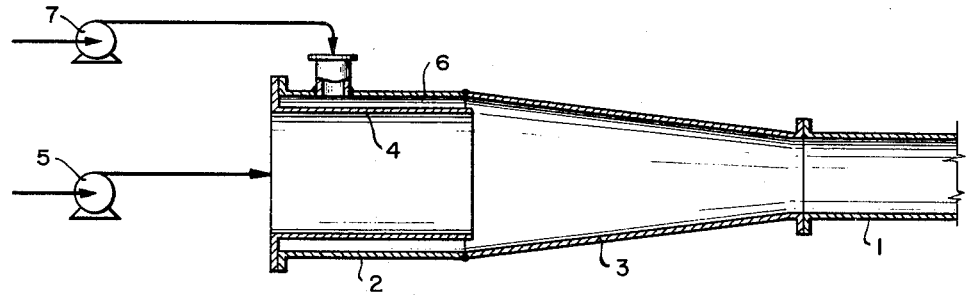
FIGURE 1 is a longitudinal cross-section taken through an inlet piece according to the invention.

That part of the inlet piece according to the invention which effects the connection to the pipeline preferably has the shape of part of the curved surface of a cone with an apex between the limits of 10 and 90 degrees. The liquids flowing from the supply openings have to be passed to the pipeline, which has a smaller diameter, without disturbing the desired flow pattern. By giving the connecting part the shape as indicated hereinbefore a reasonable guidance of the liquids is already obtained. An improvement in this respect can be obtained when in the part serving to form the connection to the pipeline means are present for guiding the viscous liquid to the pipeline. These means may consist of coaxial pipe sections which are present mainly inside the conical connecting piece and which are so arranged that, when viewed in the direction of flow, each following pipe section has a diameter smaller than that of the preceding one and is present partly inside the preceding pipe section. It is also possible to use bars or strips which, inside the conical connecting piece, are approximately directed toward the imaginary apex of that conical connecting piece, or parallel bars or strips of different lengths adapted to the available space. There are various factors which have an influence on the selection of the shape of the connecting part and, possibly, of the guiding means. Important factors are the difference in density between oil and water, the viscosity of the oil, the pumping rate and the position of the inlet piece. If the inlet piece is in the horizontal position, then an oil having a density lower than that of water will tend to move upwards, while in the opposite case the oil will tend to move downwards. Guiding means consisting of coaxial pipes as described will then have a favorable effect, particularly when the viscosity of the oil is not very high. Bars or strips, as described, will act favorably in the case of oil having a very high viscosity. In the case of the inlet piece being in the vertical position, oil with a density lower than that of water will preferably be made to flow out in the upward direction and in the opposite case in the downward direction. If the inlet piece is in the vertical position, then the beginning of the pipeline must have a bend with an appropriate radius of curvature. The ratio between the radius of curvature and the diameter of the pipeline may, for instance, be larger than 2.

Before oil surrounded by an annular layer of water is transported through a pipeline that pipeline will be filled with water. Likewise, when a transport is ended, the pipeline will first be filled with water and pumping will be stopped only after all the oil has flowed from the pipeline. For, an annular layer of water surrounding the oil can only be maintained if the average rate of flow of oil and water has a specific minimum value. A very suitable method for introducing large quantities of water for the purpose of starting or stopping transport of oil consists in providing the inlet piece with a second annular supply channel for water surrounding the annular supply channel mentioned hereinbefore, the two annular channels being in a coaxial position relative to each other. The width of the second annular channel may be larger than that of the one mentioned hereinbefore, because through that second channel a much larger quantity of water has to be introduced. Again, it will be easy for someone skilled in the art to determine the desired width on the basis of the requirements to be made in this respect. Another possibility consists in introducing the quantity of water for filling the pipeline via the central supply pipe.

The invention further provides a process for the transport through a pipeline of a viscous liquid surrounded by an annular layer of liquid with a low viscosity, which liquids are entirely or substantially insoluble with respect to each other, in which process the two liquids are introduced with the aid of an inlet piece as described, the volume flow rate of the liquid with a low viscosity lying between the limits of 0.1–25% of the volume flow rate of the viscous liquid. Very favorable results are reached when the difference between the average rates of outflow of the two liquids from the supply channels is less than 0.5 meter per second.

It is of great importance that oil can now be transported through a pipeline with only very small quantities of water. From the examples given hereinafter it is apparent that the pressure drop involved is at most equal to that of water at the same average rate of flow, irrespective of the viscosity of the oil. In many cases the pressure drop even amounts to only 60–80% thereof. This is a result of the absence of currents or vortices in the central core, which is now occupied by less mobile or even stiff oil. Formation of drops of oil in water does not occur, not even in the case of oils with a low viscosity, such as, for instance, 100 cs. The process according to the invention thus offers the following possibilities and advantages:

Very viscous oils which without this process could not be transported can now be pumped with very little water. Oils which at normal temperature are very viscous are often supplied at a comparatively high temperature, the viscosity in the initial part of the pumping process thus being low. Notwithstanding this low viscosity introduction with a surrounding layer of water without the occurrence of drop formation can now be effected by the apparatus and the process according to the invention, while no problems for the transport arise from the drop in temperature farther on in the pipeline. Also, oils with a low viscosity can now be transported by the process according to the invention, which implies that the capacity of the pipeline can be increased considerably, since the pressure drop in the pipeline is at most equal to that of water at the same average rate of flow, while the required volume of water relative to the quantity of oil transported by pumping can be negligibly small.

In FIGURE 1 the beginning of the pipeline is represented by numeral 1. The inlet piece consists of a wide part surrounded by a wall 2 and a connecting piece 3. A tubular section or pipe 4 forms the central supply pipe for oil, which can be supplied by pump 5. Between the pipes 2 and 4 there is present an annular supply channel 6. This channel is connected to a pump 7 by which water can be supplied. In this example the cross-sectional area of the central supply pipe 4 is 2.9 times as large as the cross-sectional area of the pipeline 1.

Figure 2:
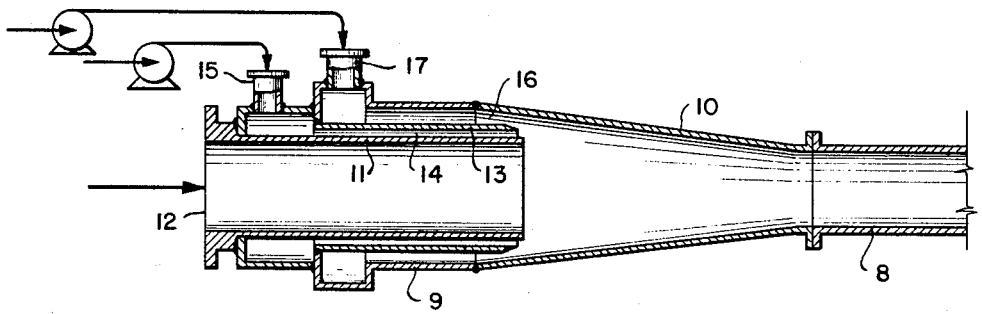
FIGURE 2 is a longitudinal cross-section taken through a modified inlet device according to the invention.

In the modified inlet device shown in FIGURE 2, numeral 8 represents the beginning of the pipeline. The wide part 9 of the inlet piece is connected by a conical part 10 to the pipeline 8. A pipe 11 forms the central supply pipe for oil, which can be supplied via opening 12. The pipe 11 is surrounded by a tubular partition or pipe 13. Between the pipes 11 and 13 there is present an annular supply channel 14 which channel can be connected by pipe 15 to a pump for the supply of water. In this figure, a second annular supply channel 16 is shown. This channel is provided with a pipe 17 for connection to a pump for the supply of water. Through channel 16 large quantities of water can be supplied after the introduction of oil through opening 12 has been terminated. Channel 16 can also be used for filling the pipeline with water before oil is introduced.

Figure 3:
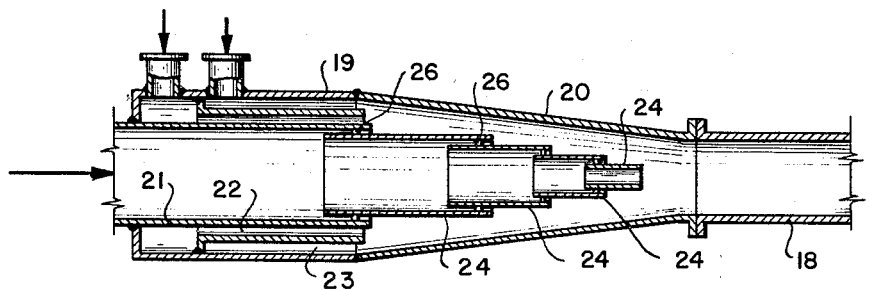
FIGURE 3 is a longitudinal section of another modified inlet device showing one form of guiding means for the viscous fluid.

Referring now to the embodiment shown in FIGURE 3, numeral 18 represents the beginning of the pipeline. The inlet piece has a wide part 19 and a conical connecting piece 20. Through pipe 21 oil can be introduced, through the annular channel 22 water, and through the second annular channel 23 likewise water, for filling the pipeline completely with water. In the inlet piece guiding means are present which consist of coaxial pipe sections 24. The pipe sections 24 may be attached to each other and to the pipe 21 by means of radially extending "spiders" or ribs 26 in order to support the pipe sections 24 in place. Alternatively, the pipe sections may be supported in any other desired fashion, for example, by means of spiders or ribs attached to the conical connecting piece 20. These are present mainly inside the conical connecting piece 20. When viewed in the direction of flow, i.e., in the direction of the pipeline 18, each following pipe section has a diameter smaller than that of the preceding one and is present partly inside the preceding pipe section. The imaginary cone whose curved surface is capable of enclosing the pipe sections 24 preferably has a larger apex than the conical surface 20.

Figure 4:
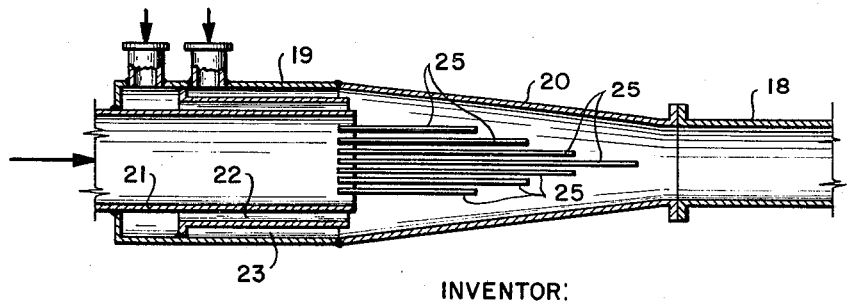
FIGURE 4 is a longitudinal section of a modified inlet device disclosing another embodiment of guiding means.

In the embodiment shown in FIGURE 4 the numerals already used in FIGURE 3 denote the same components as represented by them in that figure. In this example guiding means consisting of bars or strips 25 are shown. These bars are distributed over the section through the connecting piece 20 in the manner as indicated in such a way that they form a symmetrical pattern. The bars may be supported in place by means of spiders or ribs (not shown) similar to the ribs for supporting the pipe sections 24 as shown in the FIGURE 3 embodiment.

EXAMPLES

In a test pipe of 10 meters in length and 5 centimeters in diameter oil and water were introduced with the aid of an inlet piece according to the invention. The crosssectional area of the central supply pipe was approximately four times as large as the cross-sectional area of the pipeline. The conical connecting piece had an apex of 10 degrees. The oil had a density which varied from 0.96 to 0.97, depending on temperature. By varying the temperature in the range between 30° C. and 80° C. the viscosity of the oil was made to vary in the range between 3000 and 80 cp. The tests were carried out in a pipeline with an internal diameter of 1 inch. The results are summarized in the following table.

| $V_m$ meters/second | $\eta$ cp. | Percent water | $\Delta P_m{}^a/\Delta P_w$ | $\Delta P_m{}^b/\Delta P_w$ |
|---|---|---|---|---|
| 1 | 80 | 1 | 9 | 2.0 |
| 1 | 80 | 4 | 9 | 0.5 |
| 1.2 | 250 | 2 | 2.5 | 1.2 |
| 1.2 | 250 | 4 | 1.8 | 0.7 |
| 0.6 | 250 | 10 | 10 | 0.9 |
| 1 | 250 | 30 | 1 | 1 |
| 1 | 3,000 | 5 | 2 | 1 |

Here:
$V_m$ = average rate of flow of the liquids in the pipeline.
$\eta$ = viscosity of the oil.
Percent water = percentage of the volume flow rate of water based on the volume flow rate of water+oil.

$$\Delta P_m{}^a/\Delta P_w = \frac{\text{pressure drop of oil+water}}{\text{pressure drop of pipeline being entirely filled with water}}$$

the volume flow rate being the same in the two cases and the inlet piece employed having the same crosssectional area as the pipeline. $\Delta P_m{}^b/\Delta P_w$ = same as $\Delta P_m{}^a/\Delta P_w$, the inlet piece employed having, however, a cross-sectional area being four times as large as that of the pipeline.

In all cases with less than 30% water $\Delta P_m/\Delta P_w$ is more favorable with the new inlet piece than with conventional introduction. With 30% water an advantage was no longer found.

I claim as my invention:

1. In a pipeline for transporting a viscous liquid surrounded by an annular layer of liquid with a low viscosity, which liquids are entirely or substantially insoluble with respect to each other, improved inlet apparatus for introducing said liquid into said pipeline so that drops of said viscous liquid are substantially prevented from forming in said annular layer of low viscosity liquid, said apparatus comprising:
   an enlarged cylindrical housing positioned in substantial axial alignment with said pipeline;
   hollow connecting means connecting said enlarged cylindrical housing to said pipeline and providing a flow path for said liquids between said enlarged cylindrical housing and said pipeline;
   an open-ended tubular section carried by said housing; said section being disposed longitudinally within said housing and radially spaced therefrom to form an annular chamber therebetween and said tubular section having a substantially uniform cross-sectional area at least 50% greater than the cross-sectional area of said pipeline;
   inlet means communicating with the outside of said housing and with said annular chamber;
   means for closing said annular chamber upstream of said inlet means;
   first pumping means operatively connected to said inlet means for introducing said low viscosity liquid into said annular space; and
   second pumping means operatively connected to the interior of said tubular section for introducing said viscous liquid into said tubular section.

2. The apparatus as defined in claim 1 wherein said hollow connecting means has a generally frusto-conical configuration with the small end of the connector attached to said pipeline and the large end of the connector attached to said housing.

3. The apparatus as defined in claim 2 including:
   a tubular partition carried by said housing;
   said partition being disposed longitudinally in said annular chamber downstream from said inlet means and said partition being spaced from said housing and from said tubular section to thereby form an additional annular chamber between said partition and said housing;
   means closing said additional annular chamber near the end remote from said pipeline;
   additional inlet means formed in said housing in communication with said additional annular chamber; and,
   third pumping means connected to said additional inlet means for introducing a low viscosity liquid into said additional annular chamber.

4. An apparatus as defined in claim 2 including guiding means disposed within said connecting means for guiding said viscous liquid to said pipeline.

5. An apparatus as defined in claim 4 wherein said guiding means comprise a plurality of coaxial pipe sections arranged so that when viewed in the direction of flow each successive pipe section has a smaller diameter than the preceding section and is disposed partly inside the preceding section.

6. An apparatus as defined in claim 4 wherein said guiding means comprise a plurality of spaced elongated bars arranged in a symmetrical pattern and parallel to the direction of flow of said viscous liquid.

References Cited

UNITED STATES PATENTS

| | | | |
|---|---|---|---|
| 1,454,485 | 5/1923 | Persch | 137—13 |
| 2,337,921 | 12/1943 | Petroe | 137—237 XR |
| 3,175,571 | 3/1965 | Bankert | 138—39 XR |
| 3,307,567 | 3/1967 | Gogarty et al. | 138—39 XR |
| 3,414,004 | 12/1968 | Bankston | 137—13 XR |

FOREIGN PATENTS

| | | |
|---|---|---|
| 229,012 | 10/1958 | Australia. |
| 1,081,248 | 6/1954 | France. |
| 930,080 | 7/1963 | Great Britain. |

ROBERT R. MACKEY, Primary Examiner

U.S. Cl. X.R.

137—13, 237, 604; 138—39